US008688655B2

(12) United States Patent
Fusco et al.

(10) Patent No.: US 8,688,655 B2
(45) Date of Patent: Apr. 1, 2014

(54) NETWORK ANALYSIS (75) Inventors: Francesco Fusco, Zurich (CH);
Andreas Kind, Zurich (CH); Marc P Stoecklin, Riverdale, NY (US); Michail Vlachos, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 13/218,530

(22) Filed: Aug. 26, 2011

(65) Prior Publication Data
US 2012/0054160 A1 Mar. 1, 2012

(30) Foreign Application Priority Data
Aug. 27, 2010 (EP) .................................... 10174365

(51) Int. Cl.
*G06F 7/00* (2006.01)
*G06F 17/00* (2006.01)
*G06F 17/30* (2006.01)

(52) U.S. Cl.
USPC .......................................... 707/693; 707/745

(58) Field of Classification Search
USPC ................................................ 707/693, 745
See application file for complete search history.

(56) References Cited

U.S. PATENT DOCUMENTS

| 6,831,575 B2 | 12/2004 | Wu | |
|---|---|---|---|
| 8,356,060 B2 * | 1/2013 | Marwah et al. | 707/812 |
| 2004/0090351 A1 * | 5/2004 | Wu et al. | 341/50 |
| 2010/0138614 A1 * | 6/2010 | Glasco et al. | 711/144 |
| 2010/0246983 A1 * | 9/2010 | Hosokawa | 382/232 |
| 2010/0268695 A1 * | 10/2010 | Le Biannic | 707/693 |
| 2010/0309917 A1 * | 12/2010 | Zhang et al. | 370/392 |
| 2011/0064084 A1 * | 3/2011 | Tatar et al. | 370/392 |

OTHER PUBLICATIONS

Fusco, Francesco et al. "NET-FLi: On-the-fly Compression, Archiving and Indexing of Streaming Network Traffic." The 36th International Conference on Very Large Data Bases, Sep. 13-17, 2010, Singapore.*

* cited by examiner

*Primary Examiner* — Kimberly Wilson
(74) *Attorney, Agent, or Firm* — Jon A. Gibbons; Fleit Gibbons Gutman Bongini & Bianco PL (57) ABSTRACT

A method for providing a compressed index for a stream of binary data records comprises steps of indexing a field from each record in a bitmap index, compressing stored bits in each column of the bitmap index by replacing a group of successive bits with a code and outputting the code. There is provided at least one of a first code for replacing a sequence of a first filling, a literal and a second filling, and a second code for replacing a sequence of a first literal, a filling and a second literal. In this context, a filling is a sequence of bits with the same value and a literal is a sequence of bits with different values.

8 Claims, 8 Drawing Sheets

NETWORK ANALYSIS

CROSS-REFERENCE TO RELATED APPLICATION

This application claims priority under 35 U.S.C. §119 from European Patent Application No. 10174365.6 filed Aug. 27, 2010, the entire contents of which are incorporated herein by reference.

BACKGROUND OF THE INVENTION

1. Technical Field

The invention relates to an indexing device and a method for providing an index for a stream of data.

2. Related Art

A group of computers can be interconnected in a computer communication network to exchange information between the computers. Frequently, such a network has connections to other networks, thereby forming a hierarchical computer communication network. In order to manage such a computer network, one common task is to analyze communication at certain points of the network.

In many cases, it is a requirement to store at least a portion of the communication at one of these points for later reference. For instance, propagation of malicious software ("malware") such as viruses, worms or trojans can be tracked back to the computer from which it emerged by analyzing the traffic inside of a network or between networks. In another example, security-related communication can be post-analyzed, such as money transaction data or data related to the access of persons to a building. Depending on the size of the network and the communication activity of the computers, the number of messages exchanged between networks of moderate size can easily reach one million messages per second.

While means are known to store voluminous data communication generated by streams of such high throughput, analyzing the stored communication data remains a problem as vast amounts of data may have to be filtered for information of interest. To speed up a search for a certain pattern in the stored communication data, data indices are used. For this purpose, data records forming the stored communication data are split into header and body portions. The header includes information on a sender and a recipient of a message. A bitmap index is created for sender and recipient fields. The bitmap index is then compressed such that pattern-matching with search patterns containing Boolean operators, such as AND and OR, can be carried out on the compressed columns, for example, "records in which the sender's address is in range X AND the recipient's address is in range Y". One way of such coding is published in U.S. Pat. No. 6,831,575.

It is an object of the present invention to provide an improved method for providing a compressed index for a stream of communication data. It is a further object of the invention to provide an indexing device for carrying out said method.

SUMMARY OF THE INVENTION

One aspect of the present invention provides a method for providing a compressed index for a stream of binary data records, the method including the steps of indexing a field from one of the binary data records in a line of a bitmap index; compressing bits in a column of the bitmap index by replacing a group of successive bits with a code; and outputting the code, where a filling is a sequence of bits with the same value and a literal is a sequence of bits with different values and there is provided at least one of a first code for replacing a sequence of a first filling, a literal and a second filling, and a second code for replacing a sequence of a first literal, a filling and a second literal.

Another aspect of the present invention provides computer readable article of manufacture tangibly embodying non-transitory computer readable instructions which, when executed, cause a computer to carry out the steps of a method for providing a compressed index for a stream of binary data records, the method including the steps of indexing a field from one of the binary data records in a line of a bitmap index; compressing bits in a column of the bitmap index by replacing a group of successive bits with a code; and outputting the code, where a filling is a sequence of bits with the same value and a literal is a sequence of bits with different values and there is provided at least one of a first code for replacing a sequence of a first filling, a literal and a second filling, and a second code for replacing a sequence of a first literal, a filling and a second literal.

Another aspect of the present invention provides an indexing device for providing a compressed index for a stream of data, the stream transporting binary data records, the device including: a communication interface for sampling the stream; a processing unit adapted to carry out the method for providing a compressed index for a stream of binary data records, the method including the steps of indexing a field from one of the binary data records in a line of a bitmap index, compressing bits in a column of the bitmap index by replacing a group of successive bits with a code, and outputting the code, where a filling is a sequence of bits with the same value and a literal is a sequence of bits with different values and there is provided at least one of a first code for replacing a sequence of a first filling, a literal and a second filling, and a second code for replacing a sequence of a first literal, a filling and a second literal; and a repository for storing the coded index.

BRIEF DESCRIPTION OF THE DRAWINGS

In the following, the invention is described in more detail with reference to the accompanying drawings, in which.

DETAILED DESCRIPTION OF THE PREFERRED EMBODIMENTS

A first aspect of the invention concerns a method for providing a compressed index for a stream of binary data records, where the method includes steps of indexing a field from one of the records in a line of a bitmap index, compressing bits in a column of the bitmap index by replacing a group of successive bits with a code and outputting the code. At least one of a first code for replacing a sequence of a first filling, a literal and a second filling, and a second code for replacing a sequence of a first literal, a filling and a second literal is provided. In this context, a filling is a sequence of bits with the same value and a literal is a sequence of bits with different values.

Entries to the bitmap index are sparse and occurrences of binary 1s are generally preceded and followed by a plurality of binary 0s. Therefore, a majority of the bit groups that can be observed in the column when analyzing a stream of communication data can be compressed with said codes. This way, a higher compression rate can be achievable. In addition, the proposed coding does not differ much from the previously known WAH algorithm for generating a bitmap index, so that the proposed coding can be easily implemented on top of an existing implementation based on WAH. Furthermore, the generated compressed index can still be matched against a complex search query with Boolean operators.

Preferably, a third code for a filling and a fourth code for a literal are also provided and there are no other codes on the basis of which compressing is carried out. Codes that are rarely observed in the given context of indexing a stream of data can thus be omitted. By using only four different codes, an identification prefix of the used code can be shorter and a portion of payload data in the generated code can be larger, which can result in a more efficient compression of the bitmap index data.

The compressed index, a reference to associated data records and at least a portion of the associated data records can be written to a repository. In this manner, the process of finding data records inside of the repository in which the header fields match a certain search pattern can be significantly speeded up.

Preferably, the stream is a communication data stream between computers in a computer network. More preferably, each record can be a record of the Internet Protocol or the Netflow Protocol and the field can include a source address, a destination address, a source port, a destination port and a protocol type.

By directly supporting these protocols which are relevant for monitoring computer communication in a network, an efficient tool for network analysis, monitoring, screening, verification, accounting and planning can be given. In this way, the method can be profitably used in an existing network managing system.

For the indexing device, standard computer hardware such as a networking interface, a processing unit and a hard disc drive can be employed. System design can be kept simple and system components can be cost efficient The repository can be adapted to additionally store at least a portion of the records and a reference from the compressed index to associated records. The field can be a header and the processing unit can be adapted to accept a query including a search pattern for a header field and to return the stored portion of a data record from the repository, the header field of which matches the search pattern.

The indexing device can thus be usable as an efficient computer network communication/traffic analysis tool.

Figure 1:
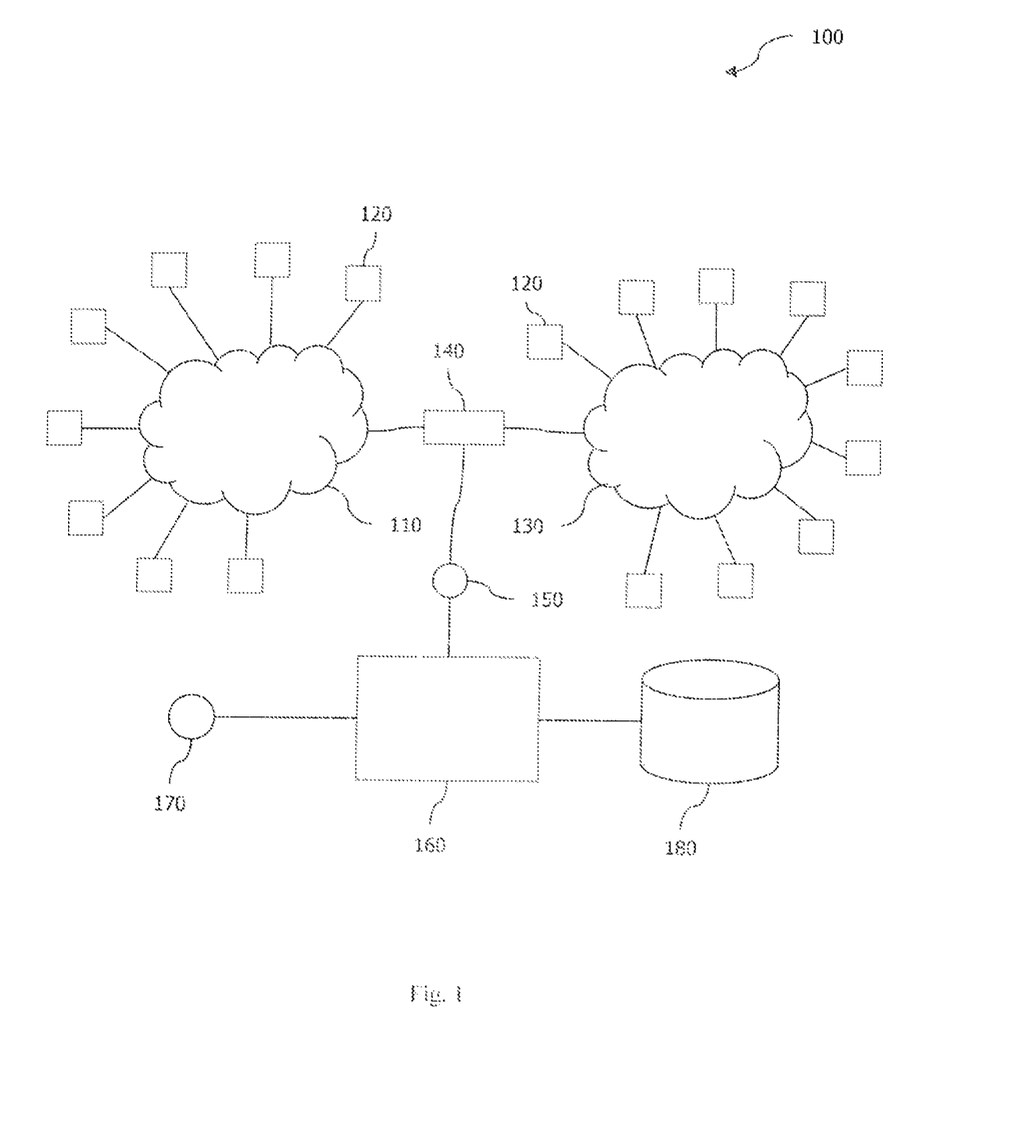
FIG. 1 shows a computer network.

FIG. 1 shows a computer network 100. The computer network 100 includes a first subnetwork 110 which is connected to a number of computers 120 and a second subnetwork 130 which is also connected to a number of computers 120. A router 140 or another networking component directs traffic between the first subnetwork 110 and the second subnetwork 130. Any of the computers 120 can communicate with any other of the computers 120. Any of the subnetworks 110 and 130 can also be connected to one or more other networks. Specifically, any of the subnetworks 110 and 130 can be part of a larger computer network, which can be a portion of the internet.

Communication between a first computer 120 which is connected to the first subnetwork 110 and a second computer 120 which is connected to the second subnetwork 130 must be routed over the router 140. Via a networking interface 150, an indexing computer 160 is connected to the router 140. The router 140 provides a copy of the communication between computers 120 on the different subnetworks 110, 130 to the indexing computer 160. Alternatively, the router 140 creates a summary for each communication between said computers 120 and provides the summary to the indexing computer 160. In yet another embodiment, the router 140 can be omitted and communication is sent by the networking interface 150 so that the communication is relayed unaltered between subnetworks 110, 130 and a copy of the communication is available to indexing computer 160.

Indexing computer 160 has connections to an operation interface 170 and a repository 180. The indexing computer 160 is adapted to process the information received via the networking interface 150 and to store at least a portion of it in compressed form in the repository 180. Additionally, the indexing computer 160 is adapted to provide a compressed index for the information stored in the repository 180. Through the operation interface 170, an operator or another computer can control the operation of the indexing computer 160. Specifically, the indexing computer 160 is adapted use the operation interface 170 to accept a query and to return a portion of the information stored inside the repository 180 in response to the query.

FIG. 2 shows two exemplary binary data records 200 that can be received by indexing computer 160 via the networking interface 150. While the invention in its most general form is applicable to all kinds of records 200 that includes at least one recognizable field with information that will later be searched for, it is primarily the area of computer networks for which the invention is optimized. The two records 200 in FIG. 2 will be used as exemplary embodiments in order to further explicate the invention.

Figure 2A:
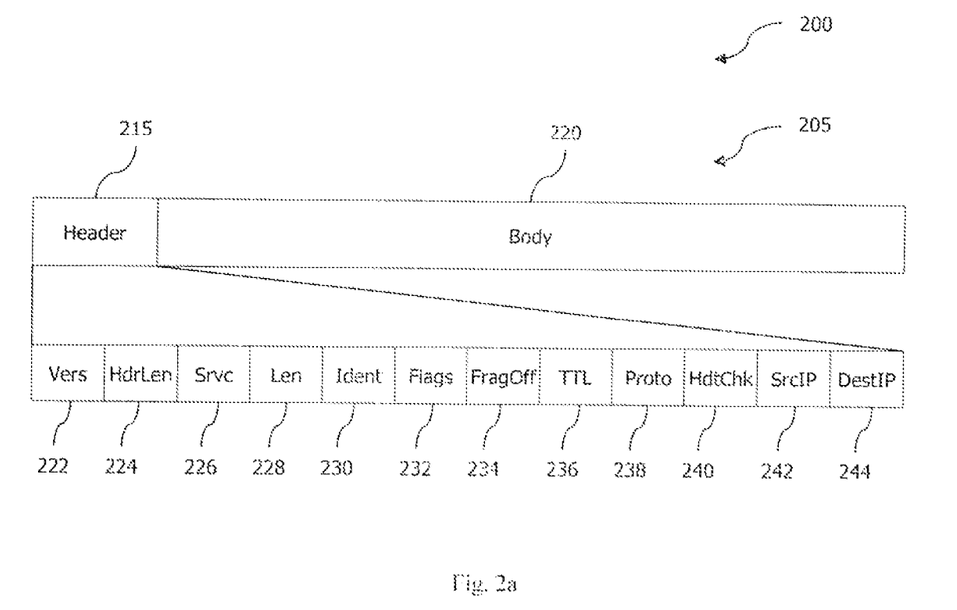
FIG. 2 shows exemplary binary data records used in FIG. 1.
Figure 2B:
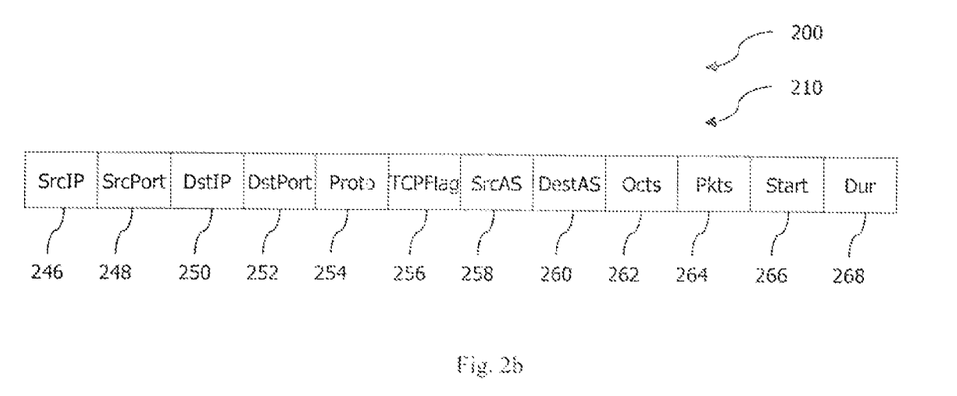

In FIG. 2a, the binary data record 200 comes in the form of an Internet Protocol Record 205 and in FIG. 2b, record 200 is in the form of a Netflow record 210. The invention is also applicable to nested records 200, where a part of the record 200 carries another record of another protocol and the other record including at least one recognizable field. Indexing can then be carried out on one or several fields of the other record.

In FIG. 2a, the internet record 205 is divided into a header 215 and a body 220. The header 215 contains administrative data and the body 220 contains payload data to be transported from one computer 120 to the other. The header 215 includes header fields 222 through 244. Communication between the two computers 120 is divided into internet records 205 which can have variable but limited size. In most cases, it takes a series of internet records 205 to carry one complete message from one computer 120 to the other one. A complete two-way communication additionally includes a series of internet records 205 from the other computer 120 to the first one. Note that the drawing of FIG. 2a is only exemplary and can not comply with all requirements of the Internet Protocol.

Header field 242 identifies a source address which is a unique address associated to the computer 120 that transmits the information contained in the body 220. Similarly, the destination address 244 contains the unique address which his associated to the computer 120 to which the internet record 205 is to be transported. In Internet Protocol version 4 (IPv4), addresses are each 32 bits long and in version 6 (IPv6), they are each 128 bits long. A protocol 238 usually indicates on whether the communication is record-oriented or connection-oriented.

The remaining fields 222 through 240 contain more administrative information that can primarily be relevant for transporting the record 200 inside the network 100 of FIG. 1 via intermediate computers or routers and will not be described here in more detail.

In FIG. 2b, the Netflow record 210 is shown, which is also known as Jflow, NetStream, Cflowd or sflow record. Netflow record 210 is a summary of a conversation from the first to the second computer 120 and generally covers a sequence of internet records 205. Several of the shown Netflow records 210 can form the body of a record 200 that describes a network flow. One Netflow record 210 can contain information on the first of the computers 120 sending an HTTP GET request to the second computer 120. A second Netflow record 210 (not displayed) can contain information on the corresponding HTTP response from the second to the first computer 120. The complete conversation between the two computers 120 can be derivable from the two corresponding Netflow records 210. Note that the drawing of FIG. 2b is only exemplary and can not comply with all requirements for an actual Netflow Record.

Netflow record 205 includes fields 246 through 268. Field 246 contains the source address and field 250 the destination address of the communicating computers 120 as described above with reference to FIG. 2a. Field 264 indicates how many records were sent from the first to the second computer. Field 268 gives an indication on how long the connection between computers 120 lasted. More administrative information is held in the other shown fields 246-268.

In many cases, records 200 that are stored inside the repository 180 will be searched by source and destination addresses as defined in header fields 242 and 244 for an internet record 205 or fields 246 and 250 for a Netflow record 210. For instance, if one of the computers 120 is suspected of spreading malware, a search conducted via the operation interface 170 can be directed to all internet records 205 in the repository 180 where the source address 215 matches the address of the computer 120 in question. By analyzing the bodies 220 of the found internet records 205, the suspicion can be substantiated or disproved. Should traces of the malware be found in the bodies 220, a recursive search on communication partners of the computer 120 in question at an earlier time can be conducted, such as to find out from where the malware came.

Figure 3:
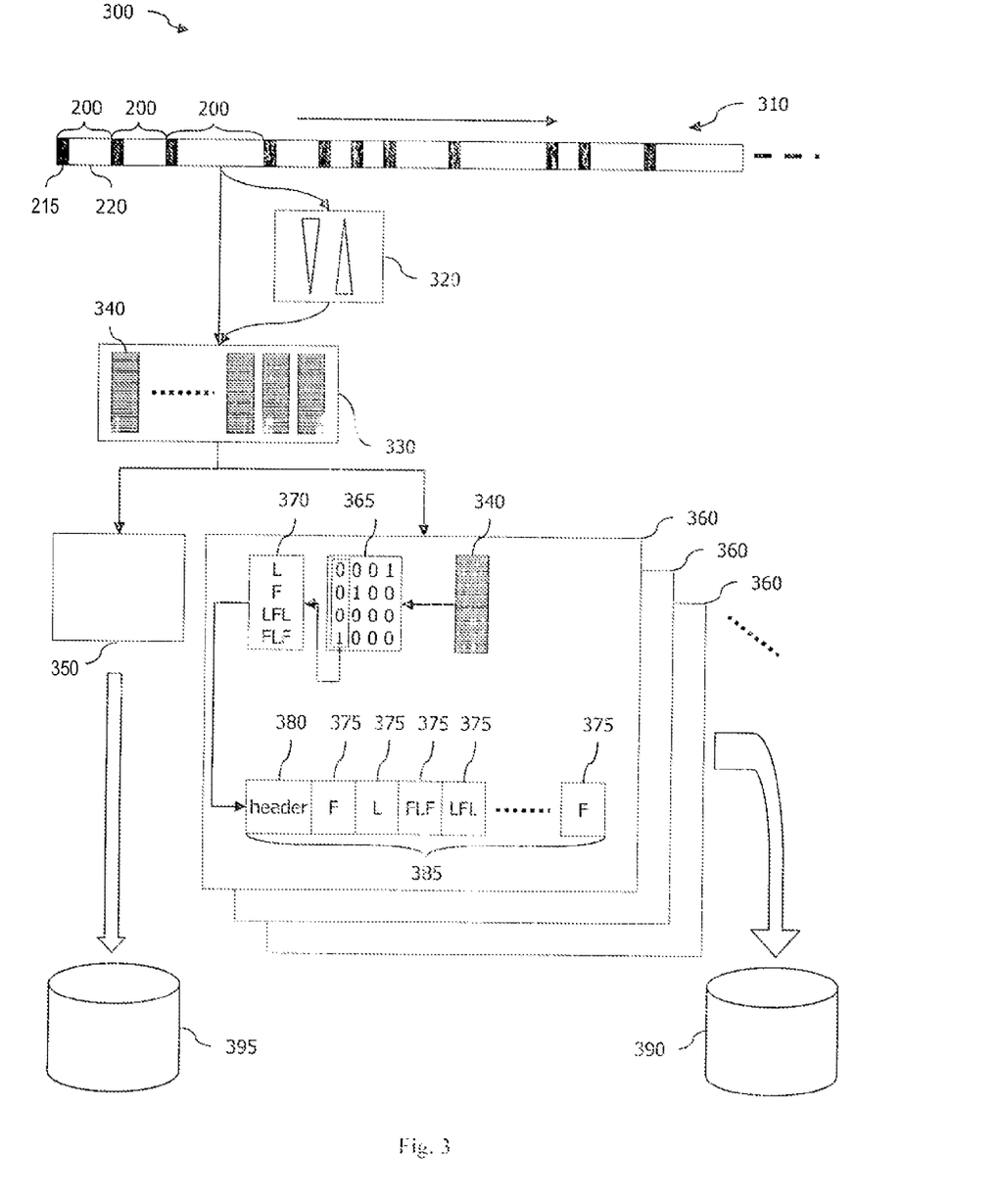
FIG. 3 shows an overview of a network analysis tool for the network of FIG. 1.

FIG. 3 shows an overview over a network analysis tool 300 for providing a searchable recording of the network communication over the router 140 in FIG. 1. The network analysis tool 300 is an expanded view of the indexing computer 160 with repository 180 in FIG. 1.

In an upper portion of FIG. 3, a stream 310 of records 200 according to FIG. 2 is shown. In the shown example, the records 200 are internet records 205 with variable sizes, each including a header 215 and a body 220. As is obvious to a person skilled in the art, an implementation on the basis of the Netflow records 210 according to FIG. 2b is also possible.

After reading records 200 from the stream with the networking interface 150 (not shown in FIG. 3), the read records 200 can optionally be routed through a sorting block 320 that sorts the records 200 so that records 200 that have a high similarity with respect to selected ones of the header fields 222-244 or fields 246-268 are sorted close to each other while records 200 that have a low similarity are sorted farther from each other. The sorting block 320 can operate on chunks including a predetermined number of records 200.

The sorted or unsorted stream 310 is fed into a chunking block 330 which optionally groups the records 200 into chunks 340 of a predetermined size, for example, 4000 records 200. The chunking block 330 also splits the records 200 into headers 215 which are relayed to a plurality of indexing blocks 360 and bodies 220 which are relayed to a compressing block 350. Preferably, several indexing blocks 360 work in parallel. In a less preferred embodiment, there is only one indexing block 360. In yet another embodiment, there is one dedicated indexing block 360 provided for each of the header fields 222-244 or fields 246-268 to be indexed and at least some of the indexing blocks 360 operate in parallel. Compressing in compressing block 350 can also run in parallel. Parallel processes can be implemented as simultaneous threads inside one or several computers.

Inside an indexing block 360, one or several of the header fields 222-244 or fields 246-268 are transformed into a bitmap index by means of a bitmapping block 365. The created bitmap index is then coded by means of a coding block 370 which uses a code book of four different codes to group bits in columns of the bitmap index together.

Several coded bitmaps 375 that each represents a portion of the bitmap index of bitmapping block 365 are supplied with a reference 380 that relates them to the actual records 200 from which the coded bitmaps 375 were derived. The coded bitmaps 375 together with the reference 380 form an entry 385 that is written to a first repository 390.

At least a portion of the body 220 of the records 200 of the chunk 340 is compressed inside the compressing block 350 using a known compressing algorithm such as the Lempel-Ziv algorithm. In a further embodiment, the uncompressed and unencoded header fields 222-244 or fields 246-268 or at least a portion of them can be compressed along with the portion of the body 220 inside the compressing block 350. The result of the compression of compressing block 350 is then stored in a second repository 395. In some embodiments, repositories 390 and 395 can be represented by a single repository, such as a set of files and a hard disc or a data base. One or both repositories 390, 395 can be part of repository 180 in FIG. 1.

Figure 4:
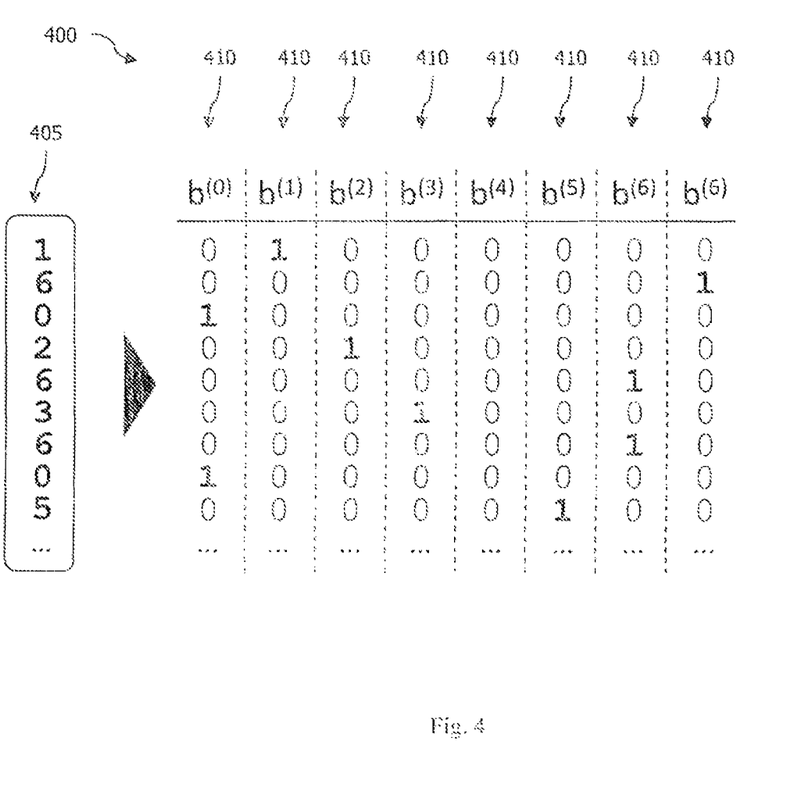
FIG. 4 shows a bitmap index.

FIG. 4 shows a bitmap index 400. On the left-hand side of FIG. 4, a sequence 405 of values of one of the header fields 222-244 or fields 246-268 of records 200 of FIG. 2 is shown in vertical. The shown sequence 405 can occur in headers 215 of successive records 200 inside a chunk 340 that is processed by one of the indexing blocks 360 of FIG. 3. On the right-hand side of FIG. 4, the values of the header fields 222-244 or fields 246-268 are expanded in such a way that for every possible value of the respective header field 222-244 or fields 246-268, a separate column 410 is kept that is associated with one of the possible values. In FIG. 4, the sequence 405 carries values between 0 and 6, therefore, there are seven columns 410. The value that is associated to each column is shown as an exponent of "b" on top of each column 410, yielding columns $b^0$ through $b^6$. For each value in the sequence 405, one line of binary 0s and 1s is written to the bitmap index 400. The column 410 with the exponent that matches the value will be supplied a binary 1, all other columns a binary 0. The bitmap index 400 thus contains only binary values 1 and 0, where the binary 1s are sparse. In an alternative embodiment, binary 0s and binary 1s can be swapped in their meaning so that the bitmap index 400 will be sparse with binary 0s and frequent with binary 1s. Such a transposition and its effects to further processing are obvious to those skilled in the art and will not be carried out any further.

The transformation of the values of the sequence 405 into the bitmap index 400 on the right-hand side of FIG. 4 is carried out by the bitmapping block 365 of FIG. 3.

FIG. 5 shows four different codes for a sequence of bits taken from one of the columns 410 of the bitmap index 400 in FIG. 4. Each code 510-540 wraps up one or more 31-bit sequences (words) from one of the columns 410 into one 32-bit code. The replacing task is carried out by coding block 370 inside of indexing block 360 of FIG. 3.

Figure 5A:
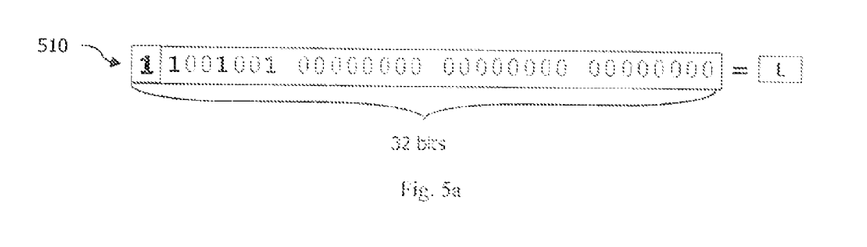
FIG. 5 shows the codebook for replacing groups of bits in the columns of the bitmap index of FIG. 4.

FIG. 5a shows the coding of a so-called literal of 31 bits. A literal is a sequence of bits that cannot be compressed any further and is therefore stored as it is. Basically, a literal can include an arbitrary sequence of binary 0s and binary 1s. A literal is coded by setting the highest bit (leftmost bit, most significant bit, MSB) of the literal code 510 to a binary 1 and supplying the unmodified 31 bits of the literal thereafter. As no compression is carried out on the literal, literal code 510 will be used only if no other code 520-540 can be applied to a sequence of bits to be encoded.

Figure 5B:
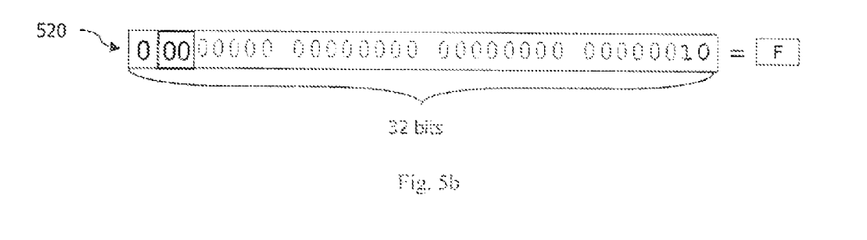

FIG. 5b shows a filler. A filler is a sequence of bits of the same value. Here, this value is binary 0, unless the meaning of binary 1s and binary 0s has been reversed, as remarked above with reference to FIG. 4. It has been observed that a column 410 of the bitmap index 400 for header fields 222-244 or fields 246-268 tends to contain long sequences of binary 0s, interspersed with relatively few binary 1s. Long sequences between the binary 1s can be profitably encoded with filler code 520 of FIG. 5b.

The filler code 520, like all other codes that do not represent a literal 510, start with a binary 0. After this, a two-bit sequence with a sub-code follows. The filler code 520 has the sub-code of binary 00 and after it, a 29 bit-long binary representation of the number of 31 bit frames with binary 0s follows. This way, a maximum of $2^{29}*31$ (about $16*10^9$) binary 0s can be represented by one filler code 520. In the example shown in FIG. 5b, two frames of 31 bits (=62 bits) of binary 0s are coded into the depicted filler frame 520.

Figure 5C:
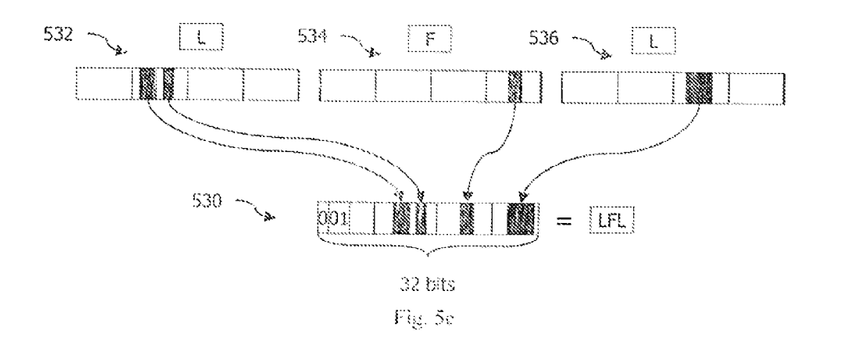

FIG. 5c shows an LFL code 530. LFL stands for literal-filler-literal, which means that a sequence of a first literal 532, a filler 534 and a second literal 536, which are displayed in an upper portion of FIG. 5c, will be encoded. The LFL code 530 starts with a binary 0 that is followed by a sub-code of binary 01.

In order to encode the first literal 532, the filler 534 and the second literal 536 into one LFL code 530 of 32 bits, it is required that no more than one of the bytes of each literal 532, 536 contains bits other than binary 0s. In this context, the bytes of a literal are groups of eight bits counted from right (least significant bit, LSB) to left (MSB) and the last byte contains only seven bits. A byte of the literal that contains one or more binary 1s is called a "dirty byte".

In the representation of FIG. 5c, dark areas denote binary 1s. The first literal 532 has a dirty byte in position binary 10 and the second literal 536 has a dirty byte in position binary 01. The filler 534 in the upper portion of FIG. 5c is a filler code 520, the dark area in its first byte represents binary 1s of the binary representation of the number of 31 bit-words of binary 0s that are represented by the filler 534.

The LFL code 530 is divided into four bytes, numbered 1 through 4 from left to right. A two-bit binary reference (binary 00 through binary 11, relating to bytes 1 through 4 of the respective literal 532, 536) to the position of the dirty byte of the first literal 532 and another two-bit reference to the position of the dirty byte of the second literal 536 are stored in the first byte of the LFL code 530. In the second and fourth byte of the LFL code 530, the dirty bytes of the first and second literals are stored, respectively. In the third byte of the LFL code 530, the number of 31 bit sequences of binary 0s of the filler 534 is stored. As there are only eight bits available for this, the maximum number of 31-bit words that can represent the filler is 256.

Figure 5D:
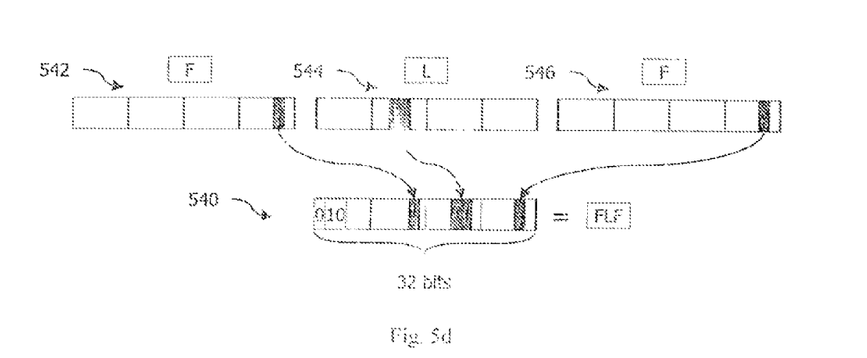

FIG. 5d shows an FLF code 540. The FLF code 540 encodes a sequence of a first filler 542, a literal 544 and a second filler 546. The depicted fillers 542, 546 are filler codes 520 and dark areas indicate binary 1s in the respective first bytes. Again, the FLF code is subdivided into four bytes, numbered 1 through 4 from left to right. The first bit of the first byte of the FLF code 540 is a binary 0 followed by a sub-code of binary 10.

To the fillers 542, 546 and the literal 544 which are encoded in the FLF code 540, the same restrictions as discussed above with reference to FIG. 5c apply, for example the literal 542, 546 have only one dirty byte each and the filler 544 represents no more than 256 words of 31 binary 0s.

In the second byte of the FLF code 540, the binary representation of the number of 31 bit-words of binary 0s that represent the first filler 542 to be encoded in the FLF code 540 is stored. The third byte of FLF code 540 holds a two-bit binary reference (binary 00 through binary 11) to the dirty byte of the literal 544. The fourth byte of FLF code 540 takes up the binary representation of the number of 31 bit-words of binary 0s that represent the second filler 546 to be encoded in the FLF code 540. The four codes 510 through 540 of FIGS. 5a through 5c represent a complete code book for encoding bit sequences of columns 410 of the bitmap index 400. There is theoretical space for a fifth code starting with a binary 0 followed by a subcode of binary 11, but at present there is no such fifth code.

Figure 6:
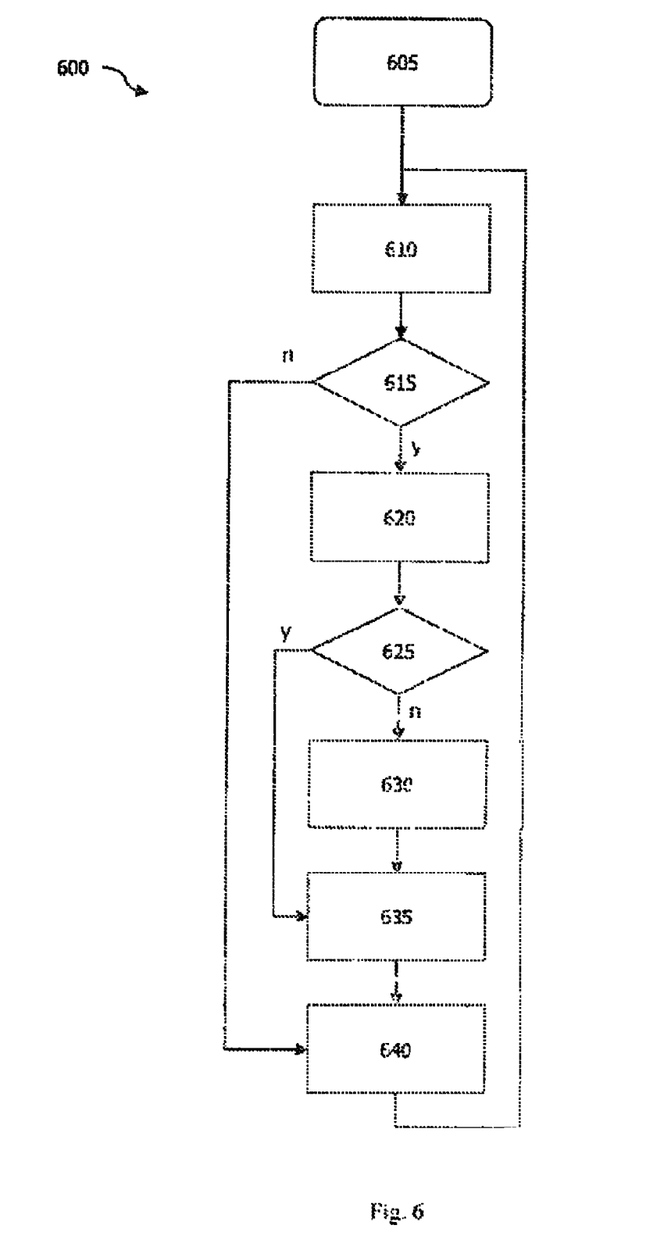
FIG. 6 shows a flowchart of a method for providing a compressed index.

FIG. 6 shows a flowchart of a method 600 for online grouping of entries to the bitmap index 400 of FIG. 4. Each time one line of data is added to of the bitmap index 400, method 600 is invoked. By using method 600, it is not necessary to actually keep the full bitmap index 400 with all binary 0s and 1s. Instead, series of binary 0s in the columns 410 are counted rather than written to the matrix.

With reference to FIG. 4, method 600 operates on one of the columns 410 of the bitmap index 400. Method 600 makes use of one local variable "lastupdate" that is individual to each of the columns 410 and one global variable "currentupdate" which is relevant for all columns 410. "Currentupdate" is incremented once per pass of method 600 and "lastupdate" is set to "currentupdate" each time data is output. For clarity, method 600 is explained for only one column 410 of the bitmap index 400.

In a first step 605, method 600 starts and "currentupdate" and "lastupdate" are set to the same number, for example zero. In a successive step 610, 31 bits of the relevant column 410 are read. In a step 615, it is determined whether at least one of the bits that have been read in step 610 has a value of binary 1. If this is the case and at least one of the read bits is a binary 1, method 600 proceeds to a step 620 in which a difference D between "currentupdate" and "lastupdate" is determined. This difference D reflects the number of times method 600 has been run without any binary 1 found in the 31 bits read in step 610. In the same step 620, variable "lastupdate" is set to "currentupdate".

Figure 8:
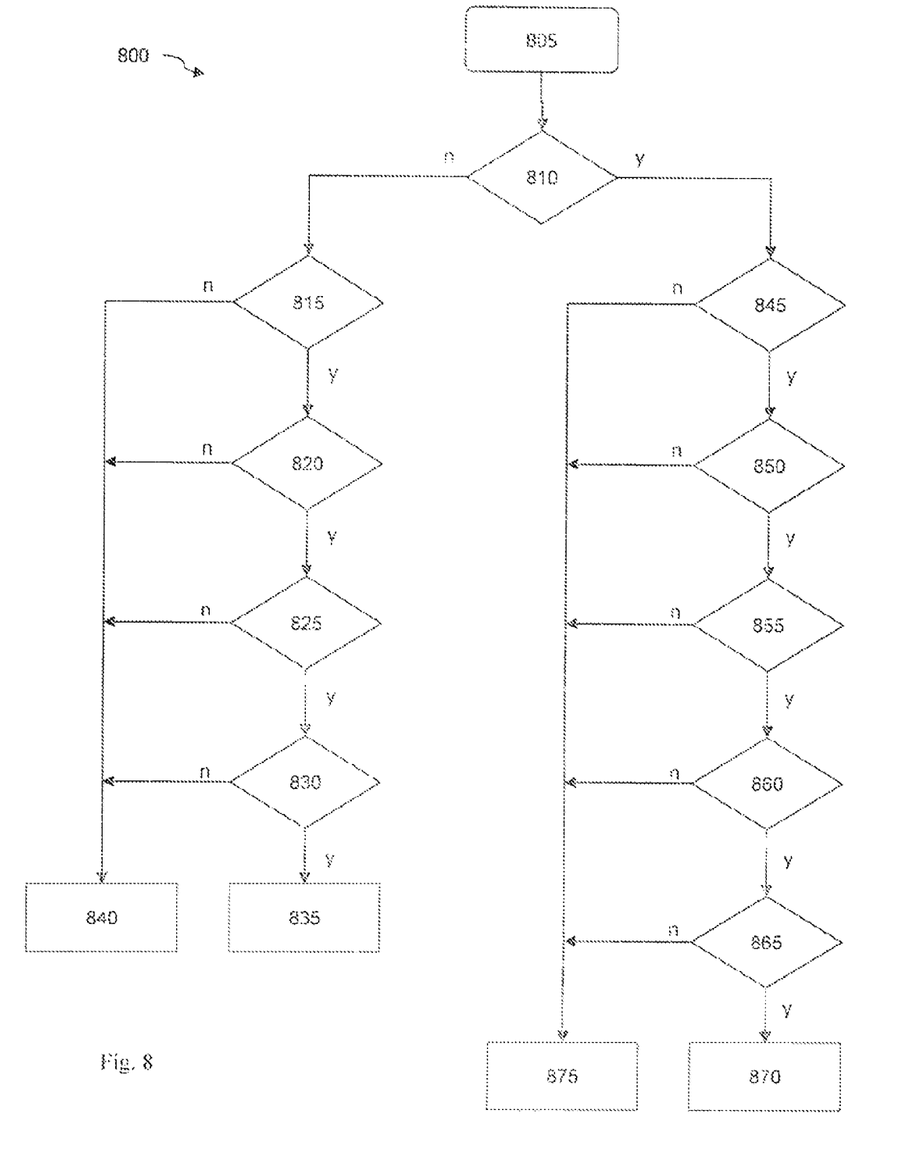
FIG. 8 a flowchart of a method for coding a sequence of bits.

In a step 625, it is determined whether the difference D is greater than 0. If this is the case, a coding method 800, which will be explained in greater detail below with reference to FIG. 8, is invoked to encode D words of 31 binary 0s. The bits passed to coding method 800 can be in encoded form with filler code 520 of FIG. 5b. After step 630, or if it was determined in step 625 that D equals 0, a step 635 is executed in which the same coding method 800 as of step 630 is invoked to encode the 31 bits that were read in step 610.

After step 635 or if it was determined up in step 615 that all the 31 bits read in step 610 were binary 0s, "currentupdate" is incremented by 1 in a step 640. After this, method 600 loops back to step 610.

As the distribution of binary 1s in bitmap index 400 if FIG. 4 is sparse, method 600 saves considerable memory space for column 410 of bitmap index 400 by basically counting successive binary 0s and calling coding method 800 only when a binary 1 can be detected in the read bits. Read groups of bits with binary 1s are encoded right away and sequences of binary 0s are counted until a group of bits with a binary 1 is read.

Not shown in FIG. 6 is an optional flushing operation which can be used to cause the immediate determination of D and the invocation of coding method 800. This can be used for example when one chunk 340 is processed to the end and no more bits can be read in step 610.

Figure 7:
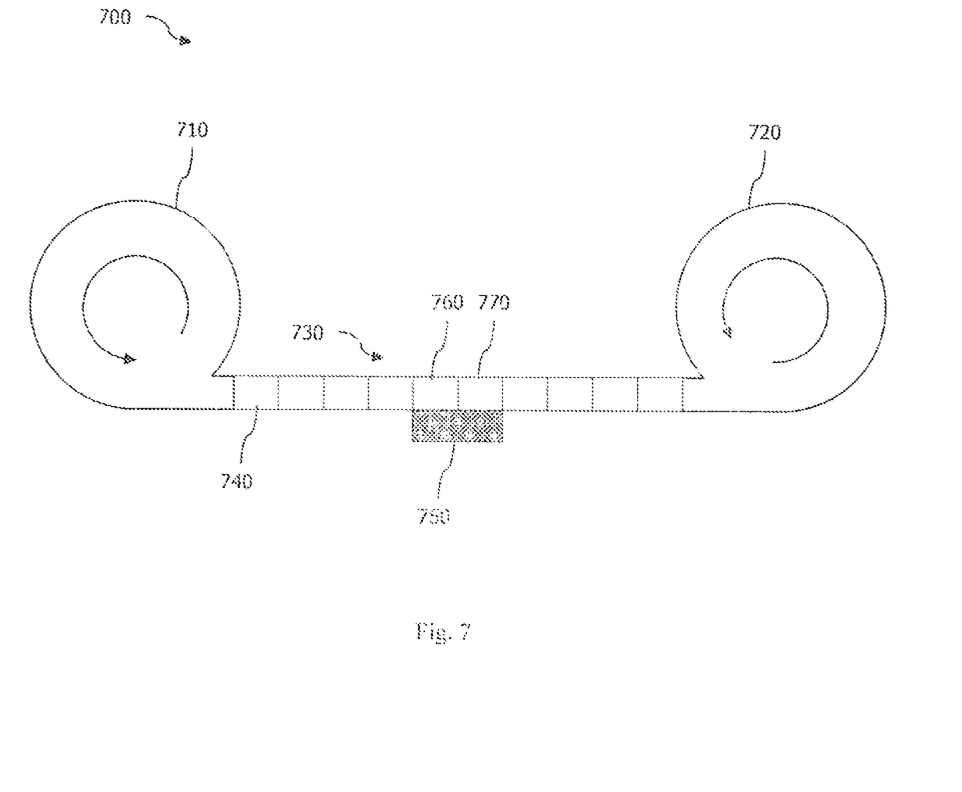
FIG. 7 shows an output queue.

FIG. 7 shows a queue 700. The queue 700 is a metaphor for explaining operation of the output queue that is employed by coding method 800. An actual queue 700 as employed with method 800 can differ from the queue 700 and specifically can be implemented in a memory of a programmable computer instead of the described hardware.

In the queue 700, between a first spool 710 and a second spool 720, a tape 730 of potentially infinite length is movable. The tape 730 is divided into cells 740, some of which are shown between the spools 710 and 720. A read/write-head 750 is positioned under a couple of cells, the left of which is called "prev" 760 and the right of which is called "pprev" 770. The read/write head 750 can be used to read and write contents of "prev" 760 and "pprev" 770. The spools 710 and 720 are adapted to move the tape from the first spool 710 on the left hand side to the second spool 720 on the right hand side so that the second spool 720 will be gradually filled with tape 730 with cells 740 that carry values written by the read/write head 750.

It is possible to move back the tape 730 from the second spool 720 to the first spool 710 in order to take information from the tape 730. For the purposes of method 800, a cell 730 that is once moved beyond the read/write-head 750 towards the second spool 720 will not be read back, altered or taken from the tape 730. Therefore, it is sufficient to implement the possibility of winding back the tape 730 by only two cells 740.

In order to take the contents of "prev" 760 from the tape 730, the contents of "pprev" 770 are moved into "prev" 760 and "pprev" 770 is marked as empty. Upon the next append operation, the contents of "prev" 760 will be moved into "pprev" 770 and the new value will be written into "prev" 760.

In order to take both "prev" 760 and "pprev" 770 from the tape 730, both "prev" 760 and "pprev" 770 are marked as empty. Upon the next append operation, the new value will be written into "prev", and upon a subsequent appending operation, the contents of "prev" 760 will be moved into "pprev" 770 and the subsequent new value will be written into "prev" 760.

If both "prev" 760 and "pprev" 770 contain values, for example, neither "prev" 760 nor "pprev" 770 is marked as empty, appending a value to the queue 700 includes moving the tape 730 to the right by one cell 740 and writing the value to "prev" 760. After that, the previous contents of "pprev" 770 are no longer under the read/write head 750 and the contents of "pprev" 770 represent what were previously the contents of "prev" 760.

FIG. 8 shows coding method 800 for coding a series of bits with codes 510-540 of FIG. 5. Used in coding block 380 of indexing block 360 in FIG. 3, coding method 800 will produce a series of codes 510-540 that represent a compressed form of one column 410 of bitmap index 400 in FIG. 4, the bitmap index 400 being based on preselected header fields 222-244 or fields 246-268 of records 200 of chunk 340.

Coding method 800 will accept pre-grouped sequences of bits provided by method 600 of FIG. 6 but can also be invoked on ungrouped words of 31 bits. The codes generated by method 800 will be written to the queue 700 of FIG. 7. Note that during operation of method 800 "prev" 760 and "pprev" 770 (unless marked as empty) will each contain one of the codes 510-540.

In a first step 805, coding method 800 accepts a group of 31 bits to be coded. In a simple implementation, this can be a group of 31 unprocessed bits. In a preferred embodiment, the group of 31 bits passed to method 800 is already pre-grouped by method 600 so that the group of bits is represented by one of the codes 510 or 520. In the following, the read group of bits is called "current".

In a successive step 810, it is determined if "current" is a filler, for example if it represents a group of bits containing only binary 0s. If "current" is a literal, for example at least one of the represented bits of "current" is a binary 1, the coding method 800 proceeds with a step 815 on the left hand side of FIG. 8.

In step 815, it is determined if "prev" 760 is a filler, for example it represents a sequence of binary 0s. If this is the case, it is determined in a step 820 if the number of 31-bit sequences of binary 0s "prev" 760 represents is smaller than 256. If this is the case, it is determined in a step 825 if "pprev" 770 contains a literal. If this is so, it is determined in a step 830 if the literal in "pprev" 770 has only one dirty byte.

If this is answered in the positive, method 800 proceeds with a step 835 in which a LFL code 530 of FIG. 5c is generated on the basis of the first literal in "pprev" 770, the filler in "prev" 760 and the second literal in "current". "Prev" 760 and "pprev" 770 are removed from the output queue 700. Next, the position of the dirty byte in the contents of "pprev" 770 and the position of the dirty byte in the contents of "current" are determined. The first byte of the generated LFL code 530 begins with binary 001 and also contains the two 2-bit positions of the dirty bytes of the first literal in "pprev" 770 and second literal in "current", respectively. The second byte of the LFL code 530 contains the dirty byte of the contents of "pprev" 770, the third byte contains the fill length of the contents of "prev" 760 and the fourth byte contains the dirty byte of the contents of "current". Finally, the generated LFL code 530 is appended to the output queue 700.

Should any one of the tests of step 815 through 830 be answered in the negative, coding method 800 continues with a step 840 in which a literal code 510 as of FIG. 5a is generated on the basis of the contents of "current". The generated literal code 510 is appended to the output queue 700.

Should it be determined in step 810 that "current" is a filler, coding method 800 proceeds to a step 845 on the right-hand side of FIG. 8 in which it is determined whether the number of 31 bit words of binary 0s the contents of "current" represents is smaller than 256. If this is the case, it is determined in a step 850 if the contents of "prev" 760 represent a literal 510. If so, it is determined in a step 855 if the contents of "prev" 760 have only one dirty byte. In this case, coding method 800 proceeds with a step 860 in which it is determined if the contents of "pprev" 770 represent a filler 520. If the answer is yes, it is determined in a step 865 whether the number of 31 bit words of binary 0s the contents of "pprev" 770 represents is smaller than 256.

If the test of step 865 is answered in the affirmative, an FLF code 540 as of FIG. 5d is generated in a step 880 on the basis of the first filler 520 in "pprev" 770, the literal 510 in "prev" 760 and the second filler 520 in "current". "Prev" 760 and "pprev" 770 are removed from the output queue 700. Then, the position of the dirty byte in the contents of "prev" 760 is determined. Byte 1 of the newly generated FLF code 540 starts with the sequence binary 010 followed by a 2-bit representation of the position of the dirty byte of the literal in "prev" 760. The second byte of FLF code 540 contains the dirty byte of the contents of "pprev" 770, the third byte contains the number of 31 bit words represented by the contents of "prev" 760 and the fourth byte contains the dirty byte of the contents of "current". Finally, the generated FLF code 540 is added to the output queue 700.

Should any of the tests of steps 845 through 865 be answered in the negative, a step 885 is executed in which a filler code 520 is created on the basis of the contents of "current" and the generated filler code 520 is appended to the output queue 700.

From the combinations that are possible for successive codes 510 through 540, it can be proved that the output queue 700 will never have to be rolled back for more than two cells 740, no matter what kind of bit sequence is read after one or two values have been taken from the cells "prev" 760 and "pprev" 770 of the queue 700.

This makes coding method 800 suitable for online use, in which a potentially endless stream of bits is encoded. Memory requirements of coding method 800 are very low, coding is very fast and the generated codes 510 through 540 provide efficient compression of the data of column 410. Also, the generated codes 510-540 can be matched against a search filter with Boolean operators, such as AND, OR, NOT without decompression.

With the aid of method 800, writing the generated codes 510-540 to a mass storage such as the first repository 390 in FIG. 3 is significantly alleviated. The first repository 390 can be adapted for primarily sequential access, like a tape storage or a network attached storage system (NAS).

Also disclosed is a non-transitory computer program product tangibly embodying computer readable instructions.

Reference List
100 computer network
110 first subnetwork
120 computer
130 second subnetwork
140 router
150 networking interface
160 indexing computer
170 operation interface
180 repository
200 binary data record
205 Internet Protocol (IP) record, aka internet packet
210 Netflow record
215 header
220 body
215-244 IP header fields
246-268 Netflow fields
300 network analysis tool
310 stream
320 sorting block
330 chunking block
340 chunk of records
350 compressing block
360 indexing block
365 bitmapping block
370 coding block
375 coded bitmap
380 reference
385 entry
390 first repository
395 second repository
400 bitmap index
410 column
510 literal (L-) code
520 filler (F-) code
530 LFL-code
532 first literal
534 filler
536 second literal
540 FLF-code
542 first filler
544 literal
546 second filler
600 method
605 start
610 get 31 bits
615 dirty ?
620 D:=currentupdate−lastupdate; lastupdate:=currentupdate
625 D>0?
630 Append D words of 31 of binary zeros
635 Append 31 bits as literal
640 currentupdate:=currentupdate+1
700 queue
710 first spool with empty tape
720 second spool with full tape
730 tape
740 cell
750 RW-head
760 prev
770 pprev
800 coding method
805 read group of bits
810 Current is a fill ?
815 Prev is a fill ?
820 Pref Fill Length <256 ?
825 PPrev is a literal ?
830 PPrev has one dirty byte ?
835 Build LFL
840 Append Literal
845 Current Fill length <256 ?
850 Prev is a Literal ?
855 Prev has one dirty byte ?
860 PPrev is a Fill ?
865 PPrev Fill Length <256 ?
870 Build FLF
875 Append Fill

The invention claimed is:

1. A method for providing a compressed index for a stream of binary data records, the method comprising the steps of:
indexing a field from one of the binary data records in a line of a bitmap index;
compressing bits in a column of the bitmap index by replacing a group of successive bits with a code; and
outputting the code,
wherein a filling is a sequence of bits with the same value and a literal is a sequence of bits with different values and there is provided at least one of:
a first code for replacing a sequence of a first filling, the literal and a second filling,
a second code for replacing a sequence of a first literal, the filling and a second literal,
wherein the method further comprises the steps of providing:
a third code for the filling, and
a fourth code for the literal, and wherein the number of different codes on the basis of which compressing is carried out is four.

2. The method according to claim 1, wherein the compressed index, a reference to associated data records, and at least one of the associated data records are written to a repository.

3. The method according to claim 1, wherein the stream is a communication data stream between computers in a computer network.

4. The method according to claim 3, wherein each binary data record is a Netflow record and the field comprises a source address, a destination address, a source port, a destination port and a protocol type.

5. A non-transitory computer readable medium tangibly embodying computer readable instructions which, when executed, cause a computer to carry out a method for providing a compressed index for a stream of binary data records, the method comprising the steps of:
    indexing a field from one of the binary data records in a line of a bitmap index;
    compressing bits in a column of the bitmap index by replacing a group of successive bits with a code; and
    outputting the code, wherein a filling is a sequence of bits with the same value and a literal is a sequence of bits with different values and there is provided at least one of:
        a first code for replacing a sequence of a first filling, the literal and a second filling,
        a second code for replacing a sequence of a first literal, the filling and a second literal,
    wherein the method further comprises the steps of providing:
        a third code for the filling, and
        a fourth code for the literal, and
    wherein the number of different codes on the basis of which compressing is carried out is four.

6. An indexing device for providing a compressed index for a stream of data, the stream transporting binary data records, the device comprising:
    a communication interface for sampling the stream;
    a processing unit configured to carry out a method for providing a compressed index for a stream of binary data records, the method comprising the steps of:
        indexing a field from one of the binary data records in a line of a bitmap index,
        compressing bits in a column of the bitmap index by replacing a group of successive bits with a code, and
        outputting the code,
        wherein a filling is a sequence of bits with the same value and a literal is a sequence of bits with different values and there is provided at least one of:
            a first code for replacing a sequence of a first filling, the literal and a second filling,
            a second code for replacing a sequence of a first literal, the filling and a second literal,
        wherein there is also provided:
            a third code for the filling, and
            a fourth code for the literal, and
        wherein the number of different codes on the basis of which compressing is carried out is four; and
    a repository for storing the coded index.

7. The indexing device according to claim 6, wherein the repository is configured to additionally store at least a portion of the record and a reference from the compressed index to associated records.

8. The indexing device according to claim 7, wherein the field is a header and the processing unit is configured to accept a query comprising a search pattern for a header field and to return from the repository the stored portion of a data record whose header field matches the search pattern.

* * * * *